United States Patent [19]
Bazilio et al.

[11] Patent Number: 4,711,328
[45] Date of Patent: Dec. 8, 1987

[54] HYDRODYNAMIC RETARDER WITH A CENTRIFUGAL ACCUMULATOR

[75] Inventors: Rayman E. Bazilio; James F. Hartz, both of Indianapolis; Anthony R. Uliana, Brownsburg, all of Ind.

[73] Assignee: General Motors Corporation, Detroit, Mich.

[21] Appl. No.: 937,836

[22] Filed: Dec. 4, 1986

[51] Int. Cl.[4] .................. F16D 57/00; F16D 57/02; F16D 33/06; F16D 33/00
[52] U.S. Cl. .................. 188/296; 188/290; 60/357; 60/366
[58] Field of Search .............. 188/290, 296; 91/534, 91/536; 192/12 A, 4 B; 60/357, 366

[56] References Cited

U.S. PATENT DOCUMENTS

| | | | |
|---|---|---|---|
| 3,122,220 | 2/1964 | Hoffstrom | 188/290 X |
| 4,488,626 | 12/1984 | Handke | 188/290 X |

FOREIGN PATENT DOCUMENTS 0660993 4/1963 Canada .................. 188/296

Primary Examiner—Andres Kashnikow
Assistant Examiner—Richard Potosnak
Attorney, Agent, or Firm—Donald F. Scherer

[57] ABSTRACT

A hydrodynamic retarder has a centrally disposed chamber which is filled with hydraulic fluid and subjected to centrifugal forces. A valve mechanism, responsive to the operator, is opened by a control valve system when vehicle retarding action is requested to permit rapid filling of the retarder vane space from the centrally disposed chamber. The valve mechanism is also closed by the control valve system after a predetermined time. This accommodates fast filling of the retarder but does not permit air ingestion by the retarder. A passage, in the stationary housing portion of the retarder, is opened to the transmission pump circuit during retarding action to maintain the retarder pressure and fluid circulation for cooling. The central chamber has an air control valve to admit air to the chamber as the chamber empties of hydraulic fluid and to permit air exhaust therefrom when the chamber is refilled.

2 Claims, 3 Drawing Figures

HYDRODYNAMIC RETARDER WITH A CENTRIFUGAL ACCUMULATOR

The invention herein described was made in the course of work under a contract or subcontract thereunder with the Department of the Army.

BACKGROUND OF THE INVENTION

This invention relates to hydraulic retarder systems and more particularly to the filling apparatus for such systems.

Hydraulic retarders are generally utilized on large vehicles to assist in vehicle braking or deceleration. Retarders are particularly useful when operating on a downgrade thereby relieving the vehicle brakes of extended usage.

When the retarder is initially activated, a large supply of pressurized fluid must be delivered to the retarder such that filling thereof will occur. Since it would not be economical to provide a hydraulic pump of sufficient displacement to accomplish the initial filling of the system, the prior art systems have utilized a pressurized accumulator.

As is well-known, an accumulator can supply a large amount of oil during short periods of time. While these systems provide for rapid filling of the retarder without significantly increasing the size of the pump, they do, however, require physical space within the transmission. If a spring-loaded accumulator is used, additional space for the compressed spring volume is required. If a gas or oil accumulator is used, intermittent checking of the pressure of the gas charge is required. The gas charge also requires some additional space in addition to the accumulator. The prior art accumulators also require a hydraulic connection with the high pressure circuit of the pump, and a control mechanism to ensure that the proper pressure level is maintained.

It has also been suggested in U.S. patent application Ser. No. 822,841, filed July 7, 1986, and assigned to the assignee of the present application, that an eductor can be used to draw oil from the oil reservoir or sump of the vehicle transmission when oil is delivered from the system pump through the input nozzle to the eductor throat. The eductor is operable, therefore, to add oil to the pump delivered oil.

SUMMARY OF THE INVENTION

The present invention seeks to reduce the filling time required in a hydrodynamic retarder by providing a source of hydraulic fluid immediately adjacent the vane area of the retarder and by maintaining this fluid under pressure until it is admitted to the vane area. This is accomplished by providing a valve mechanism which separates an inner rotating chamber from the rotating vane portion of the retarder. This inner vane chamber is filled with hydraulic fluid from a low pressure source such as the lubrication circuit. However, as the transmission is operated, a portion of the retarder is subject to rotation such that the fluid within the chamber will be subjected to centrifugal forces and therefore have a centrifugal pressure.

The valve mechanism is controlled by the operator to be opened when vehicle retardation is desired so that the pressurized fluid can rapidly enter the vane area of the hydrodynamic retarder. The valve mechanism will close after a predetermined time interval so that the inner chamber will be disconnected in the vane area.

The valve mechanism is controlled by a control valve system which is subject to the operator to determine the opening of the valve mechanism but provides a closing signal after a predetermined time interval regardless of the operator's input. The hydrodynamic retarder is also supplied with pressurized fluid from the transmission pump to maintain the retarder pressure at the desired level and to promote fluid circulation for cooling.

It is therefore an object of this invention to provide an improved hydrodynamic retarder wherein a centrally disposed rotating accumulator maintains a fluid body subject to centrifugal force which is admitted to the retarder vane area when vehicle retardation is requested.

It is another object of this invention to provide an improved hydrodynamic retarder and a centrally disposed rotating accumulator wherein fluid communication between the accumulator and the vane area of the retarder is controlled by a valve mechanism which is opened on operator demand and automatically closed after a predetermined time to control fluid communication from the accumulator to the vane area of the retarder.

These and other objects and advantages of the invention will be more apparent from the following specification and drawings.

DETAILED DESCRIPTION OF THE PREFERRED EMBODIMENT

Figure 1:
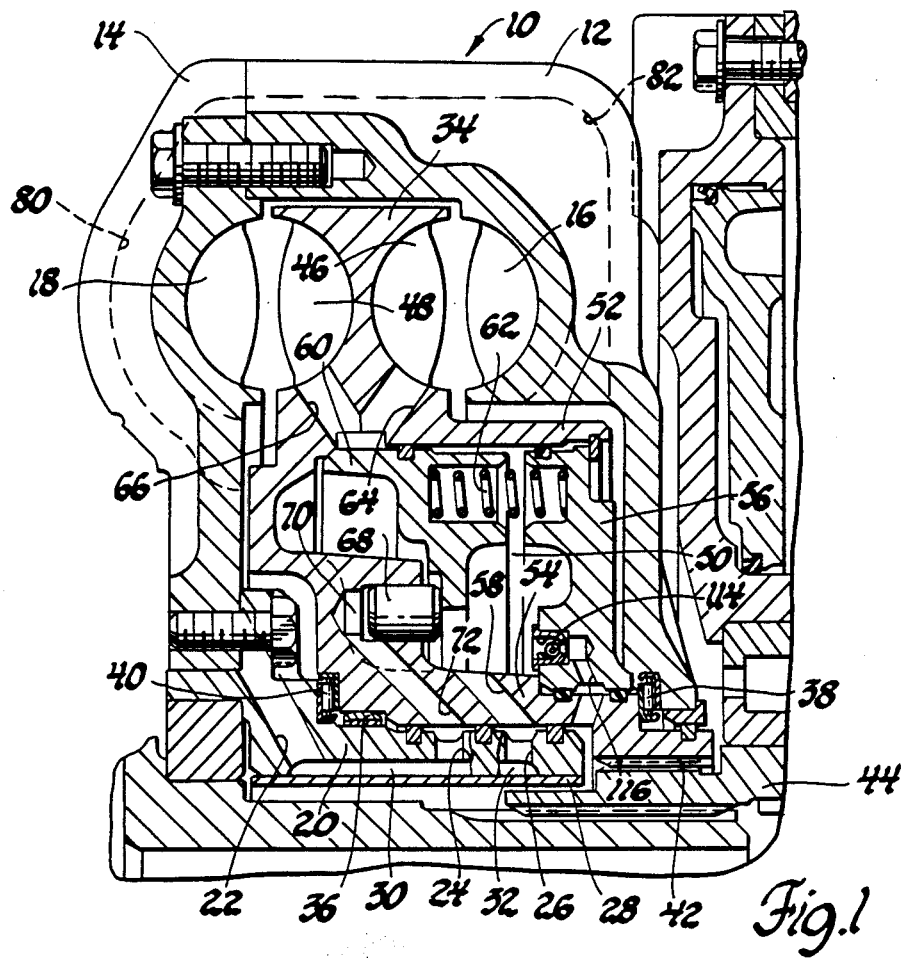
FIG. 1 is a cross-sectional elevational view of a portion of a transmission which houses a hydrodynamic retarder and a piston controlled valve assembly.

Referring to the drawings, there is seen in FIG. 1 a hydrodynamic retarder, generally designated 10. The retarder 10 includes a stationary housing assembly comprised of a housing 12 and a cover 14. These elements, the housing 12 and cover 14, are secured to a stationary portion of a transmission assembly not shown. The housing 12 has a plurality of vane members 16 and the cover 14 has a plurality of vane members 18.

A centrally disposed support hub 20 is secured to the cover 14 and has formed therein a plurality of passages 22, 24 and 26. The inner surface of the hub 20 is engaged by a bushing 28 which cooperates therewith to form a pair of fluid passages 30 and 32. The passage 30 provides fluid communication between passages 22 and 24 and the passage 32 provides fluid communication from a low pressure transmission circuit, such as the lubrication circuit (not shown), with the passage 26.

A rotatable vane housing 34 is supported on the hub 20 by a bushing or bearing 36. The rotatable vane housing 34 is also supported between the cover 14 and housing 12 by needle roller bearings 38 and 40. The rotatable vane housing 34 has formed thereon a spline member 42 which is drivingly connected to a shaft 44 which in turn rotates with a transmission shaft. Thus, whenever the transmission is operating, for example, when the vehicle is moving along the terrain, the rotatable housing 34 undergoes rotation.

The rotatable housing 34 has integrally formed or otherwise secured thereto a plurality of vanes 46 which cooperate with vane 16 and a plurality of vanes 48 which cooperate with vane 18. When the vane area encompassed by the vanes 16, 18, 46 and 48 is filled with fluid, a retarding or churning action occurs which tends to reduce the rotary speed of the housing 34.

Since, as previously described, the housing 34 is connected with a rotating shaft within the transmission, transmission rotation is retarded as is vehicle movement. The operating characteristics of hydrodynamic retarders is well known and it is not considered necessary to provide a more elaborate description of that operation at this time.

The rotatable vane housing 34 has a centrally disposed chamber 50 formed between an outer cylindrical wall 52 and an inner cylindrical wall 54. The chamber 50 is closed at the left side thereof by the rotatable housing 34 and at the right side thereof by an end cap 56. The chamber 50 is in fluid communication via a passage 58 with the passage 26. Therefore, the chamber 50 can be filled with hydraulic fluid with the low pressure source which is connected with passage 32.

An accumulator valve 60 is slidably disposed on the outer cylindrical wall 52. The valve 60 is urged leftward by a plurality of control springs 62. In the leftward position shown, the valve 60 prevents fluid communication between the chamber 50 at a pair of fluid passages 64 and 66 which communicate with vanes 46 and 48, respectively. Therefore, in the leftward position shown, the fluid maintained in the chamber 50 cannot communicate with the vane area. However, it will be appreciated that whenever the housing 34 is rotating that the fluid in chamber 50 will be subjected to centrifugal forces and therefore have a centrifugal pressure head.

A plurality of pistons, such as piston 68, are slidably disposed in the housing 34. Each piston 68 has the right end thereof disposed in abutting relationship with the valve 60. The left end of each piston 68 is in fluid communication with a respective chamber 70 which in turn is in fluid communication with the passage 24 through a passage 72. The passages 22, 30, 24 and 72 and chamber 70 are subjected to pressure from a transmission control pump 74 and the operation of a pair of control valves 76 and 78.

When the chamber 70 is subjected to fluid pressure, the pistons 68 will be urged rightward to cause the valve 60 to open the passages 64 and 66 to fluid communication with the chamber 50. The fluid in chamber 50 being subjected to a centrifugal pressure will flow radially outwardly to rapidly fill the vane space to cause the energization of hydrodynamic retardation. Since it is desirable to have a flow of cooling fluid through the retarder and also maintain the pressure within the retarder, the pump 74 is adapted to be connected to a passage 80 in the cover 14 and a passage 82 in the housing 12 by a conventional retarder control. The passage 80 communicates fluid with the vanes 18 and 48 while the passage 82 communicates fluid with the vanes 16 and 46.

After initially filling the vane space of the retarder, it is no longer necessary that the valve 60 remain open. In fact, it is desirable to close the valve 60 at this time. Accordingly, the chamber 70 is depressurized such that the springs 62 will return the valve 60 to the closed position. The depressurizing or exhausting of chamber 70 occurs automatically through the operation of valve 78.

Figure 2:
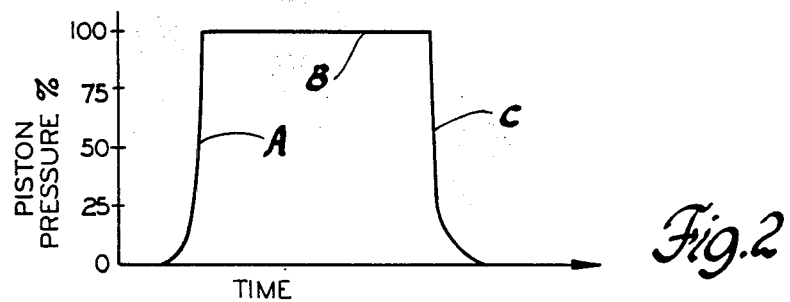
FIG. 2 is a curve of a pressure vs. time cycle during the operation of the piston shown in FIG. 1.
Figure 3:
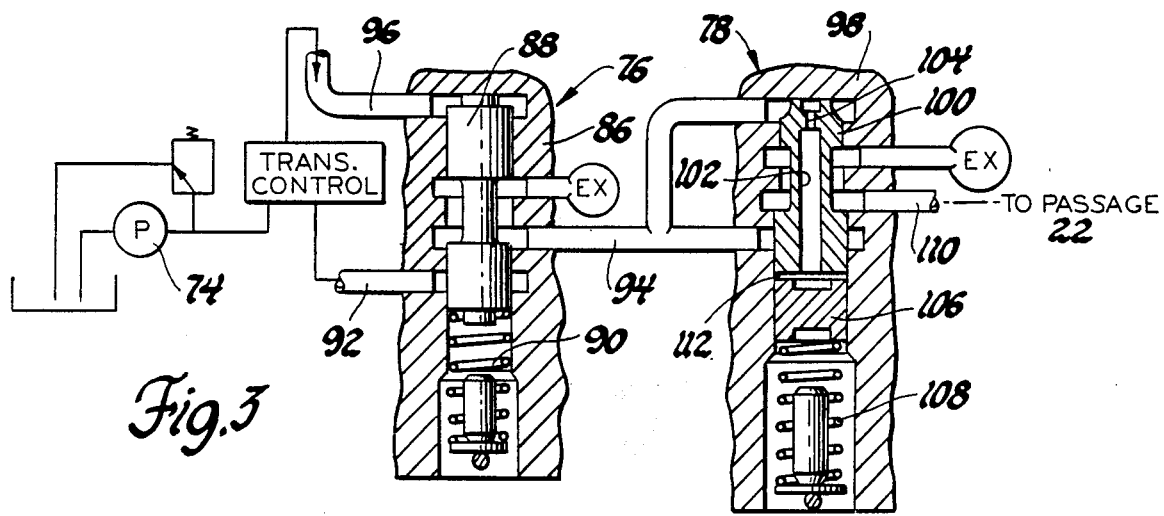
FIG. 3 is a diagrammatic representation of a valving system which controls the operation of the piston in FIG. 1 in accordance with the curve of FIG. 2.

FIG. 2 depicts the time vs. pressure relationship for the chamber 70. When the operator calls for vehicle retardation, such as applying the brakes, the pressure within chamber 70 rises in accordance with line A. For a predetermined amount of time, the pressure in chamber 70 operates along line B. After a predetermined time, the pressure in chamber 70 decays in accordance with the time and pressure relationship shown by line C.

The fluid pressure from the pump 74 is communicated with a regulator valve and a conventional transmission control which in turn communicates with the valve 76. The transmission control is operable to direct fluid to valve 76 when retardation is requested by the operator. The valve 76 includes a housing 86, a valve spool 88 and a spring 90. The spring 90 urges the valve spool to the position shown, so that the inlet passage 92 of the valve 76 is closed. The valve 76 also has an outlet passage 94 and an apply signal passage 96 and an exhaust passage.

In the valve position shown, the outlet passage 94 is in communication with the exhaust passage. When the operator calls for vehicle retardation, a pressure signal is available in passage 96, from a conventional brake control or transmission control, which causes the valve spool 88 to move against the spring 90 whereby the outlet passage 94 is disconnected from the exhaust passage and placed in communication with the inlet passage 92. The outlet passage 94 is in fluid communication with the valve 78. The valve 78 includes a housing 98 in which is slidably disposed a stepped diameter valve spool 100.

The valve spool 100 has a centrally disposed fluid passage 102 in which is secured an orifice or restriction 104. The valve spool 100 is urged to the position shown by a plug valve 106 and a spring 108. The valve 78 also has an outlet passage 110 which is connected to passage 22 and an exhaust passage.

In the position shown, the passage 94 is disconnected from the outlet passage 110 and is open to the upper end of the valve spool 100. The passage 110 is in fluid communication with the exhaust passage at this point. When the passage 94 is pressurized by the opening of valve 76, fluid pressure will act upon the small end of valve 100 urging the valve 100 downward against plug valve 106 and spring 108. This downward movement of valve spool 100 will permit fluid communication between passage 94 and passage 110 while simultaneously closing the exhaust passage from passage 110. Since passage 110 is connected to passage 22, the chamber 70 of piston 68 will be pressurized thereby causing the opening of valve 60.

The fluid under pressure at the small end of valve spool 100 will pass through restriction 104 and passage 102 to a space 112 between the plug 106 and valve spool 100. The pressure in the space 112 will increase at a rate determined by the orifice 104 and the pressure differential across the orifice 104. After a predetermined time, such as that represented by line B of FIG. 2, the pressure in space 112 acting on the larger end of valve spool 100 will eventually be sufficient to overcome the pressure acting on the small end of valve spool 100 thereby moving the valve spool 100 to the position shown except that valve spool 100 and plug valve 106 will be separated. This movement of valve spool 100 will cause passage 110 to be closed to passage 94 and opened to the exhaust passage. Therefore, the chamber 70 will be exhausted so that the springs 62 can overcome any residual pressures on the piston 68 thereby closing the valve 60. As long as the operator continues to call for vehicle retardation, the plug valve 106 will be separated from the valve spool 100. However, when the apply signal is removed from passage 96, the passage 94 will be open to the exhaust passage of valve 76 and the plug valve 106 will be permitted to return to the position shown.

When the vehicle retardation is initially called for or requested by the operator, the chamber 50 will be rapidly depleted of fluid such that it will have a tendency to ingest air. To permit the ingestion of air, a ball valve 114 is provided. This valve 114 will open as the fluid in chamber 50 passes radially outward through passages 64 and 66 to admit air and perhaps air mixed with fluid through a passage 116.

This ensures that a vacuum or low pressure condition will not occur in chamber 50. The valve 114 will also permit the exhausting of air from the chamber 50 when the valve 60 is closed and the chamber 50 is refilled with fluid via passage 26.

It should be appreciated from the above description, that the rotating chamber 50 provides a centrifugally pressurized accumulator which will rapidly fill the vane areas of the retarder at the initial request for vehicle retardation. This rotating chamber is disposed very close to the vane area such that virtually no time lapse occurs between the opening of the valve 60 and the filling of the retarder.

It should also be appreciated that the area where the accumulator is disposed might not be normally utilized for any other purpose. By placing the accumulator in this position, the need for an external accumulator disposed elsewhere within the transmission structure is eliminated. The pressurizing of the accumulator 50 between retardation signals does not require any cycling of the pump 74 or added burden on the hydraulic pressure system. The automatic closing of the valve 60 by the control valve 78 eliminates the possibility of aerated oil being admitted to the vane area of the retarder. This is accomplished by providing the proper time/pressure relationship which will ensure closing of the valve 60 either simultaneously with or shortly before the chamber 50 is empty of fluid.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydrodynamic retarder for use with a transmission having a rotary shaft, said retarder comprising: stationary housing means including vane means; rotary housing means supported for rotation relative to said stationary housing means including drive means connected with the rotary shaft, vane means disposed in operative relation with said vane means in said stationary housing means, rotary storage chamber means disposed radially inward of said vane means for storing fluid prior to delivery to said vane means, fluid passage means connecting said rotary storage chamber means with said vane means, valve means slidably disposed in said rotary storage chamber means for permitting fluid flow from said rotary storage chamber means to said vane means when the valve means is moved to an open position, selectively operable control piston means for urging said valve means to said open position and spring means for urging said valve means to a closed position; supply passage means for distributing low pressure fluid to said rotary storage chamber means; and control means for selectively operating said control piston means for opening said valve means, said fluid stored in said rotary storage chamber means being subject to a centrifugal pressure and being available for rapid delivery to said vane means upon opening of said valve means to promote a hydrodynamic braking effect between the vane means on said stationary housing means and the vane means on said rotary housing means.

2. A hydrodynamic retarder for use with a transmission having a rotary shaft, said retarder comprising: stationary housing means including vane means; rotatable housing means supported for rotation relative to said stationary housing means including drive means connected with the rotary shaft, vane means disposed in operative relation with said vane means in said stationary housing means, rotary storage chamber means disposed radially inward of said vane means for storing fluid prior to delivery to said vane means, fluid passage means connecting said rotary storage chamber means with said vane means, valve means slidably disposed in said rotary storage chamber means for permitting fluid flow from said rotary storage chamber means to said vane means when the valve means is moved to an open position, selectively operable control piston means for urging said valve means to said open position and spring means for urging said valve means to a closed position; supply passage means for distributing low pressure fluid to said rotary storage chamber means; and control means for selectively pressurizing said control piston means for opening said valve means, said fluid stored in said rotary storage chamber means being subject to a centrifugal pressure and being available for rapid delivery to said vane means upon opening of said valve means to promote a hydrodynamic braking effect between the vane means on said stationary housing means and the vane means on said rotary housing means, said control means including a valve means for exhausting the fluid pressure from said control piston means after a predetermined time for permitting closing of said valve means by said spring means.

* * * * *